(12) United States Patent
Henry (10) Patent No.: US 11,930,730 B2
(45) Date of Patent: Mar. 19, 2024

(54) SYSTEM AND METHOD FOR DETERMINING SOIL CLOD SIZE WITHIN A FIELD (71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 475 days.

(21) Appl. No.: 17/202,891

(22) Filed: Mar. 16, 2021

(65) Prior Publication Data
US 2022/0295687 A1 Sep. 22, 2022

(51) Int. Cl.
*A01B 79/00* (2006.01)
*A01B 76/00* (2006.01)
*G06K 9/00* (2022.01)
*G06K 9/60* (2006.01)
*G06V 10/20* (2022.01)
*G06V 20/13* (2022.01)
*G06V 20/56* (2022.01)

(52) U.S. Cl.
CPC .......... *A01B 79/005* (2013.01); *A01B 76/00* (2013.01); *G06V 10/20* (2022.01); *G06V 20/13* (2022.01); *G06V 20/56* (2022.01)

(58) Field of Classification Search
CPC ..... A01B 79/005; A01B 76/00; A01B 69/001; A01B 27/005; A01B 27/00; G06V 10/20; G06V 20/13; G06V 20/56
See application file for complete search history.

(56) References Cited

U.S. PATENT DOCUMENTS

| 10,650,538 | B2 | 5/2020 | Ferarri et al. |
| 10,729,058 | B2 | 8/2020 | Ferarri et al. |
| 10,748,042 | B2 | 8/2020 | Ferarri et al. |
| 10,820,478 | B1 | 11/2020 | Ferarri et al. |
| 10,916,028 | B1 | 2/2021 | Barrick |

(Continued)

OTHER PUBLICATIONS

Taconet, et al., "A Contour-Based Approach for Clods Identification and Characterization on a Soil Surface", Soil & Tillage Research, 109, dated 2010 (10 pages).

(Continued)

*Primary Examiner* — Charles R Kasenge
(74) *Attorney, Agent, or Firm* — Rebecca L. Henkel; Rickard K. DeMille (57) ABSTRACT

A method for determining soil clod size within a field includes receiving an image depicting an imaged portion of the field. Furthermore, the method includes identifying a soil clod present within the imaged portion of the field. Additionally, the method includes determining a maximum height of the identified soil clod above a soil surface of the field. Moreover, the method includes determining a maximum length of the identified soil clod. In addition, the method includes determining a radius of a sphere based on the determined maximum height and the determined maximum length, with the sphere including a first portion approximating a portion of the identified soil clod positioned above the soil surface and a second portion approximating a portion of the identified soil clod positioned below the soil surface. Furthermore, the method includes determining a size of the identified soil clod based on the determined radius.

15 Claims, 6 Drawing Sheets

(56) References Cited

U.S. PATENT DOCUMENTS

| | | | |
|---|---|---|---|
| 2015/0176987 A1* | 6/2015 | Thimirachandra | G01B 11/028 356/4.01 |
| 2018/0206393 A1 | 7/2018 | Stoller et al. | |
| 2020/0005474 A1* | 1/2020 | Ferrari | G06V 10/46 |
| 2020/0187408 A1 | 6/2020 | Forbes et al. | |
| 2020/0191972 A1* | 6/2020 | Zhao | G01S 17/931 |
| 2021/0049750 A1 | 2/2021 | Poosa | |

OTHER PUBLICATIONS

Chimi-Chiadjeu, et al., "Automatic Clod Detection and Boundary Estimation from Digital Elevation Model Images Using Different Approaches" Catena, 118, dated 2014 (11 pages).

Extended European Search Report for corresponding EP Application No. 22161731 dated Aug. 9, 2022.

\* cited by examiner

SYSTEM AND METHOD FOR DETERMINING SOIL CLOD SIZE WITHIN A FIELD

FIELD OF INVENTION

The present disclosure generally relates to systems and methods for identifying characteristics of a field and, more particularly, to systems and methods for determining soil clod size within a field.

BACKGROUND OF THE INVENTION

It is well known that to attain the best agricultural performance from a piece of land, a farmer must cultivate the soil, typically through a tillage operation. Common tillage operations include plowing, harrowing, and subsoiling. Farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

For example, modern farm practices demand a smooth, level field with small clods of soil in the fall and spring of the year. In this respect, residue must be cut, sized, and mixed with soil to encourage the residue to decompose and not build up following subsequent passes of machinery. To achieve such soil conditions, it is known to use rolling baskets, such as crumbler reels, to produce smaller, more uniform clod sizes and to aid in the mixing of residue. However, the ability of an operator to assess the effectiveness of a tillage operation in breaking down soil clods and/or otherwise providing desired surface conditions for the field is quite limited. As such, systems have been developed that determine the size of soil clods present within the field. While these systems work well, further improvements are needed. For example, such systems are unable to accurately determine the size of soil clods partially buried within the soil of the field.

Accordingly, an improved system and method for determining soil clod size within a field would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a method for determining soil clod size within a field. The method includes receiving, with a computing system, an image depicting an imaged portion of the field. Furthermore, the method includes identifying, with the computing system, a soil clod present within the imaged portion of the field. Additionally, the method includes determining, with the computing system, a maximum height of the identified soil clod above a soil surface of the field. Moreover, the method includes determining, with the computing system, a maximum length of the identified soil clod. In addition, the method includes determining, with the computing system, a radius of a sphere based on the determined maximum height and the determined maximum length, with the sphere including a first portion approximating a portion of the identified soil clod positioned above the soil surface and a second portion approximating a portion of the identified soil clod positioned below the soil surface. Furthermore, the method includes determining, with the computing system, a size of the identified soil clod based on the determined radius.

In another aspect, the present subject matter is directed to a system for determining soil clod size within a field. The system includes an imaging device configured to capture an image of a field and a computing system communicatively coupled to the imaging device. The computing system, in turn, includes a processor and associated memory, with the memory storing instructions that, when implemented by the processor, configure the computing system to receive an image depicting an imaged portion of the field. Furthermore, the computing system is configured to identify a soil clod present within the imaged portion of the field and determine a maximum height of the identified soil clod above a soil surface of the field. Additionally, the computing system is configured to determine a maximum length of the identified soil clod. Moreover, the computing system is configured to determine a radius of a sphere based on the determined maximum height and the determined maximum length, with the sphere including a first portion approximating a portion of the identified soil clod positioned above the soil surface and a second portion approximating a portion of the identified soil clod positioned below the soil surface. In addition, the computing system is configured to determine the size of the identified soil clod based on the determined radius.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining soil clod size within a field. More specifically, a computing system may receive an image depicting an imaged portion of the field. Furthermore, the computing system may analyze the received image to identify a soil clod present within the imaged portion of the field. Thereafter, the computing system may determine the maximum height of the identified soil clod above the soil surface of the field and the maximum length of the identified soil clod.

In several embodiments, the computing system may be configured to determine the size of the identified soil clod based on the radius of a sphere approximating the identified soil clod. Specifically, the sphere may include first and second portions. The first portion of the sphere may approximate the portion of the identified soil clod positioned above the soil surface of the field. Conversely, the second portion of the sphere may approximate the portion of the identified soil clod positioned below the soil surface. In one embodiment, the computing system may determine the volume of the first portion of sphere based on the determined maximum height and length. In such an embodiment, the computing system may then determine the radius of the sphere based on the determined volume of the first portion of the sphere. Alternatively, in another embodiment, the computing system may define a curve within a vertical plane based on the determined maximum height and length. The curve may, in turn, correspond to the perimeter of a cross-section of the first portion of the sphere within the vertical plane. In such an embodiment, the computing system may then extend the curve below the soil surface to form a circle such that the portion of the formed circle positioned below the soil surface corresponds to the perimeter of a cross-section of the second portion of the sphere within the vertical plane. Additionally, in such an embodiment, the computing system may then determine the radius of the sphere based on the formed circle. Thereafter, the computing system may determine the size of the identified soil clod based on the determined radius.

Determining the size of a soil based on a sphere approximating the whole soil clod, including the portion of the soil clod position below the soil surface, generally improves agricultural operations. More specifically, many soil clods are partially buried within the soil of the field. Conventional systems for determining soil clod size are unable to account for the portion of the soil clod that is buried when determining the soil clod size. However, by using a sphere approximating the whole soil clod, the disclosed system and method can determine the total size or volume of the soil clod, including the buried portion of the soil clod. Thus, the disclosed systems and methods provide more accurate soil clod size determinations, thereby allowing for more accurate control of tillage implement tools (e.g., the basket assemblies), which improves the effectiveness of the tillage operation and the subsequent agricultural performance of the field.

Figure 1:
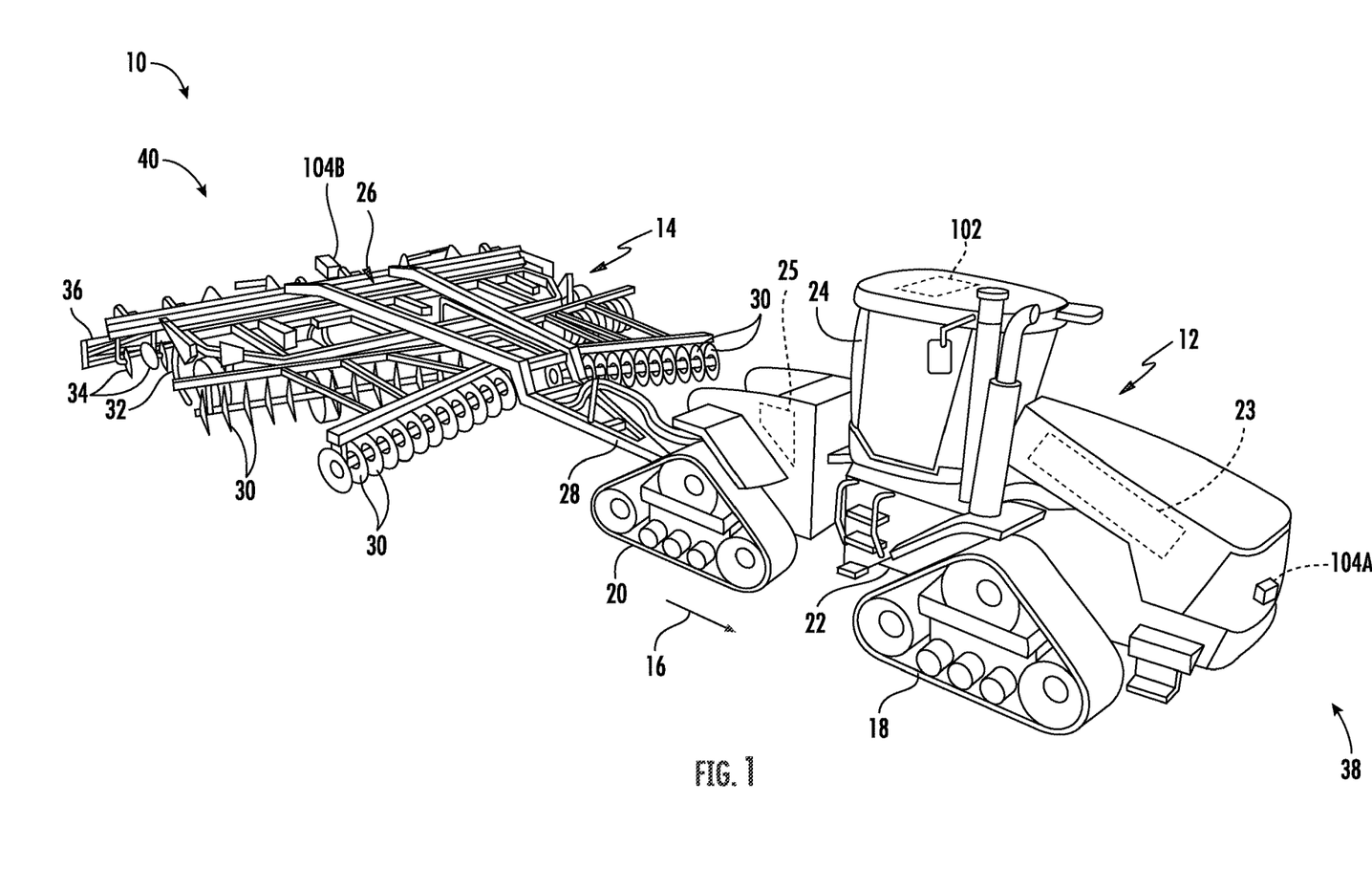
FIG. 1 illustrates a perspective view of one embodiment of an agricultural machine in accordance with aspects of the present subject matter.

Referring now to drawings, FIG. 1 illustrates a perspective view of one embodiment of an agricultural machine 10 in accordance with aspects of the present subject matter. As shown, in the illustrated embodiment, the agricultural machine 10 includes a work vehicle 12 and an associated agricultural implement 14. In general, the work vehicle 12 is configured to tow the implement 14 across a field in a direction of travel (indicated by arrow 16). In the illustrated embodiment, the work vehicle 12 is configured as an agricultural tractor and the implement 14 is configured as an associated tillage implement. However, in other embodiments, the work vehicle 12 may be configured as any other suitable type of vehicle, such as an agricultural harvester, a self-propelled sprayer, and/or the like. Similarly, the implement 14 may be configured as any other suitable type of implement, such as a planter. Furthermore, the agricultural machine 10 may correspond to any suitable powered and/or unpowered agricultural machine (including suitable vehicles and/or equipment, such as only a work vehicle or only an implement). Additionally, the agricultural machine 10 may include more than two associated vehicles, implements, and/or the like (e.g., a tractor, a planter, and an associated air cart).

As shown in FIG. 1, the work vehicle 12 includes a pair of front track assemblies 18, a pair or rear track assemblies 20, and a frame or chassis 22 coupled to and supported by the track assemblies 18, 20. An operator's cab 24 may be supported by a portion of the chassis 22 and may house various input devices for permitting an operator to control the operation of one or more components of the work vehicle 12 and/or one or more components of the implement 14. Additionally, the work vehicle 12 may include an engine 23 and a transmission 25 mounted on the chassis 22. The transmission 25 may be operably coupled to the engine 23 and may provide variably adjusted gear ratios for transferring engine power to the track assemblies 18, 20 via a drive axle assembly (not shown) (or via axles if multiple drive axles are employed).

Additionally, as shown in FIG. 1, the implement 14 may generally include a carriage frame assembly 26 configured to be towed by the work vehicle 12 via a pull hitch or tow bar 28 in the direction of travel 16 of the vehicle 12. In general, the carriage frame assembly 26 may be configured to support a plurality of ground-engaging tools, such as a plurality of shanks, disk blades, leveling blades, basket assemblies, tines, spikes, and/or the like. For example, in the illustrated embodiment, the carriage frame assembly 26 is configured to support various gangs of disc blades 30, a plurality of ground-engaging shanks 32, a plurality of leveling blades 34, and a plurality of crumbler wheels or basket assemblies 36. However, in alternative embodiments, the carriage frame assembly 26 may be configured to support any other suitable ground-engaging tools and/or combination of ground-engaging tools. In several embodiments, the various ground-engaging tools may be configured to perform a tillage operation or any other suitable ground-engaging operation across the field along which the implement 14 is being towed. In addition to being towed by the work vehicle 12, the implement 14 may also be a semi-mounted implement connected to the work vehicle 12 via a two-point hitch (not shown) or the implement 14 may be a fully mounted implement (e.g., mounted the work vehicle's 12 three-point hitch (not shown)).

It should be appreciated that the configuration of the agricultural machine 10 described above and shown in FIG. 1 is provided only to place the present subject matter in an exemplary field of use. Thus, it should be appreciated that the present subject matter may be readily adaptable to any manner of machine configuration, including any suitable work vehicle configuration and/or implement configuration. For example, in an alternative embodiment of the work vehicle 12, a separate frame or chassis may be provided to which the engine, transmission, and drive axle assembly are coupled, a configuration common in smaller tractors. Still other configurations may use an articulated chassis to steer the work vehicle 12 or rely on tires/wheels in lieu of the track assemblies 16, 18. Similarly, as indicated above, the carriage frame assembly 26 of the implement 14 may be configured to support any other suitable combination of type of ground-engaging tools.

Moreover, a location sensor 102 may be provided in operative association with the agricultural machine 10. For instance, as shown in FIG. 1, the location sensor 102 is installed on or within the vehicle 12. However, in other embodiments, the location sensor 102 may be installed on or within the implement 14. In general, the location sensor 102 may be configured to determine the current location of the vehicle 12 and/or the implement 14 using a satellite navigation positioning system (e.g., a GPS system, a Galileo positioning system, the Global Navigation satellite system (GLONASS), the BeiDou Satellite Navigation and Positioning system, and/or the like). In such an embodiment, the location determined by the location sensor 102 may be transmitted to a computing system of the agricultural machine 10 (e.g., in the form coordinates) and stored within the computing system's memory for subsequent processing and/or analysis. For instance, based on the known dimensional configuration and/or relative positioning between the vehicle 12 and the implement 14, the determined location from the location sensor 102 may be used to geo-locate the implement 14 within the field.

Furthermore, in accordance with aspects of the present subject matter, the agricultural machine 10 may include one or more imaging devices 104 coupled thereto and/or supported thereon. As will be described below, the imaging device(s) 104 may be configured to capture images or other image data depicting the soil clods present within the field across which the agricultural machine 10 is traveling.

In several embodiments, the imaging device(s) 104 may be provided in operative association with the agricultural machine 10 such that the imaging device(s) 104 has a field(s) of view directed towards a portion(s) of the field adjacent to the work vehicle 12 and/or the implement 14, such as a portion(s) of the field disposed in front of, behind, and/or along one or both of the sides of the work vehicle 12 and/or the implement 14. For example, as shown in FIG. 1, in one embodiment, an imaging device(s) 104A may be provided at a forward end 38 of the work vehicle 12 to allow the imaging device(s) 104A to capture images and related data of a section of the field disposed in front of the work vehicle 12. Such a forward-located imaging device(s) 104A may allow pre-tillage images of the field to be captured for monitoring or determining soil clod size within the field prior to the performance of a tillage operation. Similarly, as shown in FIG. 1, a second imaging device(s) 104B may be provided at or adjacent to an aft end 40 of the implement 14 to allow the imaging device(s) 104B to capture images and related data of a section of the field disposed behind the implement 14. Such an aft-located imaging device(s) 104B may allow post-tillage images of the field to be captured for monitoring or determining soil clod size within the field after the performance of a tillage operation. In alternative embodiments, the imaging device(s) 104 may be installed at any other suitable location(s) on the work vehicle 12 and/or the implement 14. Additionally, in other embodiments, the agricultural machine 10 may only include a single imaging device(s) 104 mounted on either the work vehicle 12 or the implement 14 or may include more than two imaging device(s) 104 mounted on the work vehicle 12 and/or the implement 14.

Moreover, each imaging device(s) 104 may be mounted or otherwise supported relative to a portion of the agricultural machine 10 using any suitable mounting/support structure. For instance, in one embodiment, each imaging device(s) 104 may be directly or indirectly mounted to a portion of the work vehicle 12 and/or the implement 14. Specifically, in one embodiment, suitable mounting structure (e.g., mounting arms, brackets, trays, etc.) may be used to support each imaging device(s) 104 out in front of the vehicle 12 or behind the implement 14 (e.g., in a cantilevered arrangement) to allow the imaging device(s) 104 to obtain the desired field of view, including the desired orientation of the device's field of view relative to the field (e.g., a straight-down view oriented generally perpendicular to the surface of the field).

In general, the imaging device(s) 104 may correspond to any suitable device(s) or other assembly configured to capture images of the field. For instance, in several embodiments, the imaging device(s) 104 may correspond to a stereo camera assembly having first and second cameras 106, 108 (FIG. 2) incorporated therein or otherwise forming a part thereof. In such embodiments, the stereo camera assembly may be used to capture both two-dimensional and three-dimensional images of the field. Specifically, each camera may include a lens and a separate image sensor for capturing two-dimensional images. Additionally, by simultaneously capturing an image of the same portion of the field with each camera, the separate images can be combined, compared, and/or otherwise processed to extract three-dimensional information about such portion of the field. For example, by comparing the images captured by each camera, a depth image and/or a disparity image or map can be generated that allows the scene depth to be determined (e.g., relative to the camera) at each corresponding pixel location within the imaged portion of the field, which, in turn, can be converted into a scene height (or pixel height) at each corresponding pixel location relative to a reference plane (e.g., a reference plane approximating the soil surface). As a result, the relative height of specific features or points within the field may be determined, such as the relative height of soil within the field. It will be appreciated that, in addition to a stereo camera assembly or as an alternative thereto, the agricultural machine 10 may include any other suitable type of imaging device(s) 104. For instance, suitable imaging device(s) 104 may also include monocular cameras, single-spectrum cameras, multi-spectrum cameras and/or the like.

Figure 2:
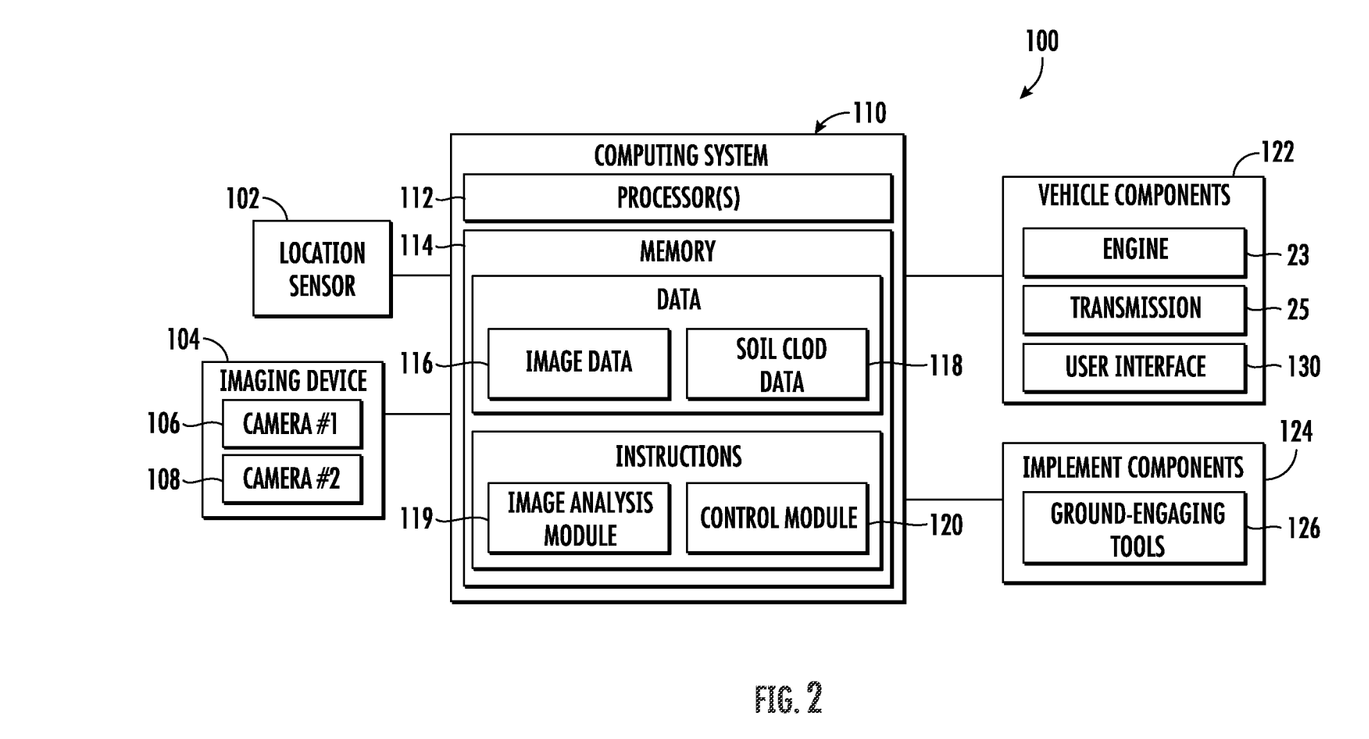
FIG. 2 illustrates a schematic view of one embodiment of a system for determining soil clod size within a field in accordance with aspects of the present subject matter.

Referring now to FIG. 2, a schematic view of one embodiment of a system 100 for determining soil clod size within a field is illustrated in accordance with aspects of the present subject matter. In general, the system 100 will be described herein with reference to the agricultural machine 10 described above with reference to FIG. 1. However, it should be appreciated by those of ordinary skill in the art that the disclosed system 100 may generally be utilized with agricultural machines having any other suitable machine configuration.

As shown in FIG. 2, the system 100 may include one or more components of the agricultural machine 10 described above with reference to FIG. 1. For example, in several embodiments, the system 100 may include a location sensor (e.g., the location sensor 102 shown in FIG. 1) configured to capture data associated with the location of the agricultural machine 10 within the field. Furthermore, in several embodiments, the system 100 may include one or more of the imaging device(s) (e.g., imaging devices 104 shown in FIG. 1) configured to capture images of a portion(s) of the field disposed adjacent to the work vehicle 12 and or the implement 14. As indicated above, in several embodiments, one or more of the imaging device(s) 104 may correspond to a stereo camera assembly including first and second cameras 106, 108 for capturing both two-dimensional and three-dimensional images of the field. Additionally, the system 100 may include or be associated with one or more other components of the work vehicle 12 and/or the implement 14.

The system 100 may further include a computing system 110 communicatively coupled to location sensor 102 and/or the imaging device(s) 104. In several embodiments, the computing system 110 may be configured to receive location data (e.g., coordinates) captured by the location sensor 102 to allow the location of the agricultural machine 10 within the field to be determined. Moreover, the computing system 110 may be configured to receive and process the images captured by the imaging device(s) 104 to allow the size(s) of the soil clod(s) present within the imaged portions of the field to be determined. For instance, as will be described below, the computing system 110 may be configured to execute one or more suitable image processing algorithms for determining the soil clod size(s) based on the captured images.

In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the image processing algorithm(s) and/or related method(s) described below. In addition, the computing system 110 may also include various other suitable components, such as a communications circuit or module, one or more input/output channels, a data/control bus and/or the like.

The computing system 110 may correspond to an existing controller of the work vehicle 12 or the implement 14 or the computing system 110 may correspond to a separate processing device. For instance, in one embodiment, the computing system 110 may form all or part of a separate plug-in module or computing device that is installed relative to the work vehicle 12 or implement 14 to allow for the disclosed system and method to be implemented without requiring additional software to be uploaded onto existing control devices of the work vehicle 12 or implement 14.

In several embodiments, the memory 114 of the computing system 110 may include one or more databases for storing information received and/or generated by the computing system 110. For instance, as shown in FIG. 2, the memory 114 may include an image database 116 storing the images captured by the imaging device(s) 104, including the images themselves (e.g., the 2D images captured by the cameras 106, 108) and/or data deriving from the images (e.g., disparity maps or 3D depth images generated based on the 2D images captured by the cameras 106, 108). Additionally, the memory 114 may include a soil clod database 118 storing data associated with the soil clod size(s) being determined by the computing system 110. For instance, as will be described below, the images and related data deriving from the imaging device(s) 104 may be used to determine the size(s) of the soil clod(s) present within the imaged portion of the field. In such instance, the soil clod size data generated by the computing system 110 may be stored within the soil clod database 118 for subsequent processing and/or analysis.

Moreover, as shown in FIG. 2, in several embodiments, the instructions stored within the memory 114 of the computing system 110 may be executed by the processor(s) 112 to implement an image analysis module 119. In general, the image analysis module 119 may be configured to process/analyze the images received from the imaging device(s) 104 and/or the data deriving therefrom to estimate or determine the size(s) of one or more soil clod present within the imaged portion of the field. Specifically, in several embodiments, the image analysis module 119 may be configured to execute one or more image processing algorithms, such as the imaging processing algorithms described herein, to allow the soil clod size(s) to be estimated or determined by the computing system 110.

Referring still to FIG. 2, in one embodiment, the instructions stored within the memory 114 of the computing system 110 may also be executed by the processor(s) 112 to implement a control module 120. In general, the control module 120 may be configured to electronically control the operation of one or more components of the agricultural machine 10. For instance, in several embodiments, the control module 120 may be configured to control the operation of the agricultural machine 10 based on the determined soil clod size(s). Such control may include controlling the operation of one or more components 122 of the work vehicle 12, such as the engine 23 and/or the transmission 25 of the vehicle 12 to automatically adjust the ground speed of the agricultural machine 10. In addition (or as an alternative thereto), the control module 120 may be configured to electronically control the operation of one or more components 124 of the implement 14. For instance, the control module 120 may be configured to adjust the operating parameters associated with (e.g., position of, force being applied, etc.) one or more of the ground-engaging tools 126 of the implement 14 (e.g., the disc blades 30, shanks 32, leveling blades 34, and/or basket assemblies 36) to proactively or reactively adjust the operation of the implement 14 in view of the monitored soil clod parameter(s).

Although the various control functions and/or actions will generally be described herein as being executed by the computing system 110, one or more of such control functions/actions (or portions thereof) may be executed by a separate computing system or may be distributed across two or more computing systems (including, for example, the computing system 110 and a separate computing system). For instance, in one embodiment, the computing system 110 may be configured to acquire data from the imaging device(s) 104 for subsequent processing and/or analysis by a separate computing system (e.g., a computing system associated with a remote server). In another embodiment, the computing system 110 may be configured to execute the image analysis module 119 to determine the soil clod size(s), while a separate computing system (e.g., a vehicle computing system associated with the agricultural machine 10) may be configured to execute the control module 120 to control the operation of the agricultural machine 10 based on data and/or instructions transmitted from the computing system 110 that are associated with the determined soil clod size(s).

Figure 3:
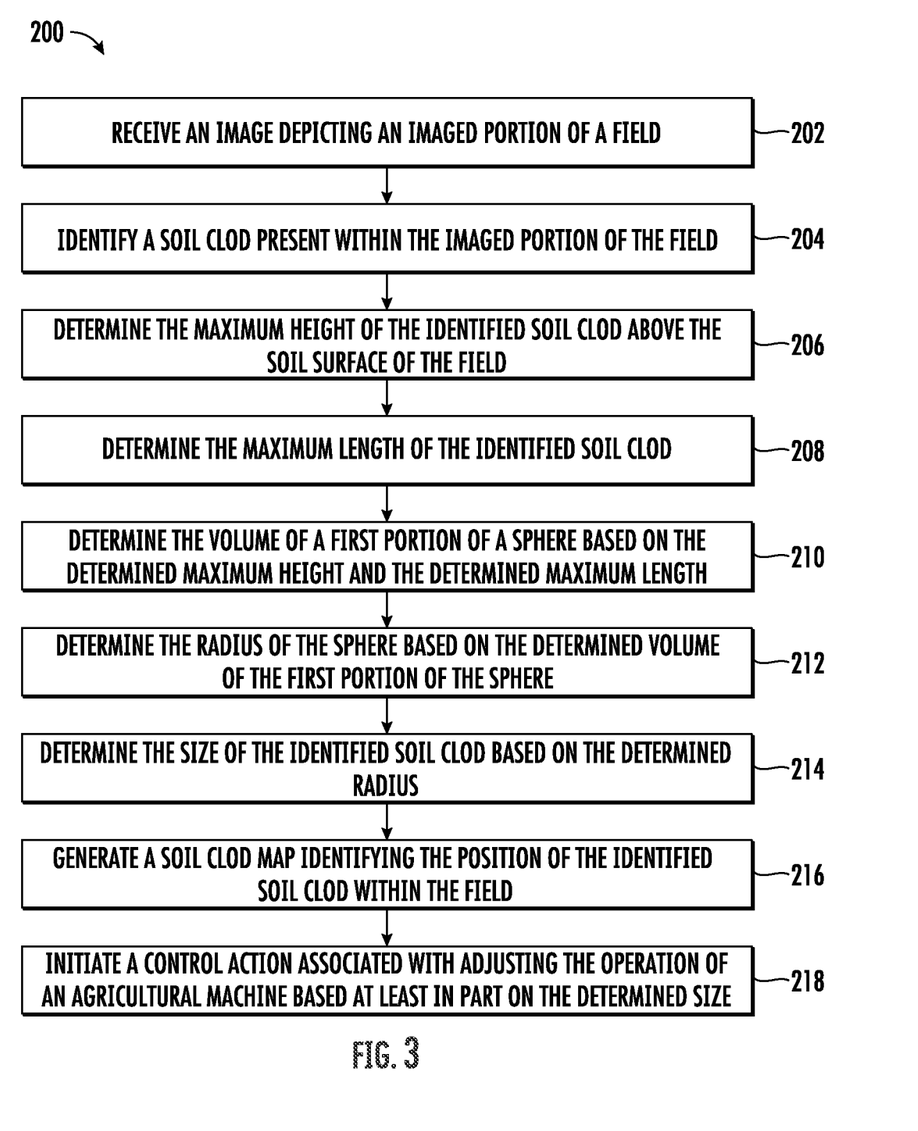
FIG. 3 illustrates a flow diagram providing one embodiment of example control logic for determining soil clod size within a field in accordance with aspects of the present subject matter.

Referring now to FIG. 3, a flow diagram of one embodiment of example control logic 200 that may be executed by the computing system 110 (or any other suitable computing system) for determining soil clod size within a field is illustrated in accordance with aspects of the present subject matter. Specifically, the control logic 200 shown in FIG. 3 is representative of steps of one embodiment of an image processing algorithm that can be executed to determine the size(s) of the soil clod(s) present within the imaged portions of a field with substantial accuracy and without requiring substantial computing resources and/or processing time. Thus, in several embodiments, the control logic 200 may be advantageously utilized in association with a system installed on or forming part of an agricultural machine to allow for real-time determination of soil clod size as the machine travels across the field during the performance of an agricultural operation. However, in other embodiments, the control logic 200 may be used in association with any other suitable system, application, and/or the like for determining soil clod parameters of a field.

As shown in FIG. 3, at (202), the control logic 200 includes receiving an image depicting an imaged portion of the field. For example, as indicated above, the computing system 110 may be communicatively coupled to the imaging device(s) 104, thereby allowing images captured by the imaging device(s) 104 to be transmitted to and received by the computing system 110.

For the purposes of clarity, the below steps of the control logic 200 will be described in the context of processing a single captured image. These steps may be repeated on each subsequently captured image to make soil clod size determinations for the imaged portion of the field associated with each subsequent image.

At (204), the control logic 200 includes identifying a soil clod present within the imaged portion of the field. Specifically, in several embodiments, the computing system 110 may be configured to analyze/process the received image (e.g., the image data received at (202)) to identify one or more soil clods present within the imaged portion of the field. For example, the computing system 110 may implement the image analysis module 119 to use one or more image processing algorithms and/or computer vision techniques to identify soil clods depicted within the received image. Such image processing algorithms and/or computer vision techniques may include, for example, an edge-finding routine in which the edges of each soil clod depicted within the received image are identified. However, in alternative embodiments, the computing system 110 may be configured to identify soil clods present within the received image in any other suitable manner.

Furthermore, as shown in FIG. 3, at (206), the control logic 200 includes determining the maximum height of the identified soil clod above the soil surface of the field. Specifically, in several embodiments, each pixel within the received image may have an associated pixel height. As such, in several embodiments, the computing system 110 may implement the image analysis module 119 to determine the maximum height of each identified soil clod. For example, the computing system 110 may determine the maximum pixel height of the group of the pixels forming each identified soil clod. Thereafter, the computing system 110 may assign the determined maximum pixel height for each identified soil clod as its maximum height. However, in alternative embodiments, the computing system 110 may be configured to determine the maximum height of each identified soil clod in any other suitable manner.

Additionally, at (208), the control logic 200 includes determining the maximum length of the identified soil clod. In general, the maximum length of a soil clod is its maximum dimension or an average of several dimensions in a non-vertical plane. For example, in some embodiments, the maximum length may be the maximum dimension or an average of several dimensions of the identified soil clod within a horizontal plane (i.e., a plane parallel to the soil surface of the field). This is sometimes referred to as the width. As such, in several embodiments, the computing system 110 may be configured to implement the image analysis module 119 to determine the maximum length of each identified soil clod. For example, in some embodiments, the computing system 110 may radiate pairs of rays from the pixel of each identified soil clod having the greatest pixel height. Each ray of a given pair of rays may, in turn, radiate in opposite directions from the corresponding pixel having the greatest pixel height. In one embodiment, the pairs of rays may be radiated outwardly every forty-five degrees. However, the rays may be radiated in any other suitable angular increments. Thereafter, the computing system 110 may determine the length of each pair of oppositely extending rays. The computing system 110 may then, for each identified soil clod, assign the greatest of the determined lengths of its rays as its maximum length. However, in alternative embodiments, the computing system 110 may be configured to determine the maximum length of each identified soil clod in any other suitable manner.

Figure 5:
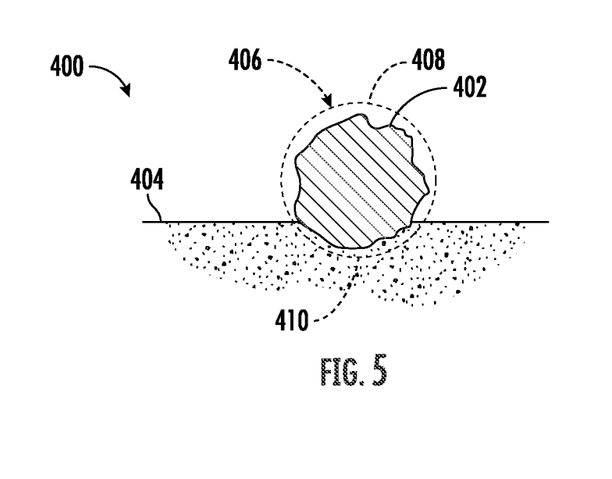
FIG. 5 illustrates a cross-sectional view of an example soil clod in accordance with aspects of the present subject matter, particularly illustrating a sphere approximating the example soil clod.

In accordance with aspects of the present subject matter, the determined maximum height and length of each identified soil clod may be used to define a sphere that approximates the size of each soil clod. Each sphere may, in turn, include a first portion positioned above the soil surface. Thus, the first portion of each sphere approximates the portion of the soil clod extending or otherwise projecting above the soil surface. Furthermore, each sphere may also include a second portion positioned below the soil surface. Thus, the second portion of each sphere approximates the portion of that soil clod buried within the soil of the field. For example, FIG. 5 illustrates an example cross-sectional view of a soil clod 402 present within a field 400. The soil clod 402 is partially buried within the soil of the field 400 such that a portion of the soil clod 402 is positioned below a soil surface 404 of the field 400. As shown, a sphere (indicated by dashed lines 406) is approximating the size of the soil clod 402. Specifically, the sphere 406 includes a first portion 408 approximating the portion of the soil clod 402 above the soil surface 404 and a second portion 410 approximating the portion of the soil clod 402 positioned below the soil surface 404. As will be described below, a sphere determined based on the maximum length and height of a soil clod may be used to determine the size of that soil clod.

As shown in FIG. 3, at (210), the control logic 200 may include determining the volume of a first portion of a sphere based on the determined maximum height and the determined maximum length. Specifically, in several embodiments, the computing system 110 may be configured to implement the image analysis module 119 to determine the volume of the first portion of a sphere approximating each identified soil clod based on the determined maximum height and length. That is, the computing system 110 may use the determined maximum height (e.g., the determined maximum height at (206)) and the determined maximum length (e.g., the determined maximum length at (208)) to determine the volume of a portion of a sphere approximating the size of the portion of each identified soil clod positioned above the soil surface. For example, in one embodiment, the computing system 110 may use the following equation:

$$V_{First\ Portion} = \frac{1}{6}\pi h(3a^2 + h^2) \quad (1)$$

where $V_{First\ Portion}$ is the volume of the first portion of the sphere, h is the maximum height, and a is the maximum length. In this respect, the first portion of each sphere may be known as its sphere cap. However, in alternative embodiments, the computing system 110 may determine the volume of the first portion of the sphere approximating each identified soil clod in any other suitable manner.

Moreover, at (212), the control logic 200 includes determining the radius of the sphere based on the determined volume of the first portion of the sphere. Specifically, in several embodiments, the computing system 110 may be configured to implement the image analysis module 119 to determine the radius of the sphere approximating each identified soil clod based on the volume of the first portion of a sphere approximating each identified soil clod. For example, the computing system 110 may use a look-up table or any suitable mathematical formula that allows the radius of each sphere to be determined from the volume of its first portion.

Furthermore, as shown in FIG. 3, at (214), the control logic 200 includes determining the size of the identified soil clod based on the determined radius of the sphere. Specifically, in several embodiments, the computing system 110 may be configured to implement the image analysis module 119 to determine the size of each sphere approximating an identified soil clod based on its determined radius. The computing system 110 may then assign the determined size of each sphere as the size of the correspond soil clod. Moreover, the determined size(s) of the identified soil clod(s) may correspond to any suitable size-based parameter, such as volume, mass, diameter, etc.

In addition, at (216), the control logic 200 includes generating a soil clod map identifying the position of the identified soil clod within the field. More specifically, as the agricultural machine 10 travels across the field, the computing system 110 may be configured to receive location data (e.g., coordinates) from the location sensor 102. Based on the known dimensional configuration and/or relative positioning between the imaging devices(s) 104 and the location sensor 102, the computing system 110 may geo-locate each identified soil clod within the field. For example, in one embodiment, the coordinates derived from the location sensor 102 and the soil clod identifications may both be time-stamped. In such an embodiment, the time-stamped data may allow the soil clod identifications to be matched or correlated to a corresponding set of location coordinates received or derived from the location sensor 102. Thereafter, the computing system 110 may be configured to generate a soil clod map identifying the position of each identified soil clod within the field.

Furthermore, at (218), the control logic 200 includes initiating a control action associated with adjusting the operation of an agricultural machine based at least in part on the determined soil clod size. Specifically, in several embodiments, the computing system 110 may be configured to execute the control module 120 to initiate a control action based on the determined soil clod size(s), such as when the determined soil clod size(s) falls outside of a desired range(s) or does not meet or satisfy an associated threshold(s). For example, in one embodiment, the computing system 110 may be configured to provide a notification to the operator of the agricultural machine 10 indicating that the determined soil clod size(s) is not at a desired level. For instance, in one embodiment, the computing system 110 may cause a visual or audible notification or indicator to be presented to the operator via an associated user interface (not shown) provided within the cab 24 of the vehicle 12.

In other embodiments, the computing system 110 may be configured to execute an automated control action designed to adjust the operation of the agricultural machine 10 based at least in part on the determined soil clod size(s). For instance, in one embodiment, the computing system 110 may be configured to increase or decrease the operational or ground speed of the agricultural machine 10 to adjust the monitored soil clod size(s). In addition to the adjusting the ground speed of the agricultural machine 10 (or as an alternative thereto), the computing system 110 may also be configured to adjust an operating parameter associated with the ground-engaging tools of the implement 12. For instance, the computing system 110 may control the operation of one or more actuators (not shown) configured to adjust the position of and/or force being applied to the basket assemblies 56 of the implement 14 based at least in part on the determined soil clod size(s).

Figure 4:
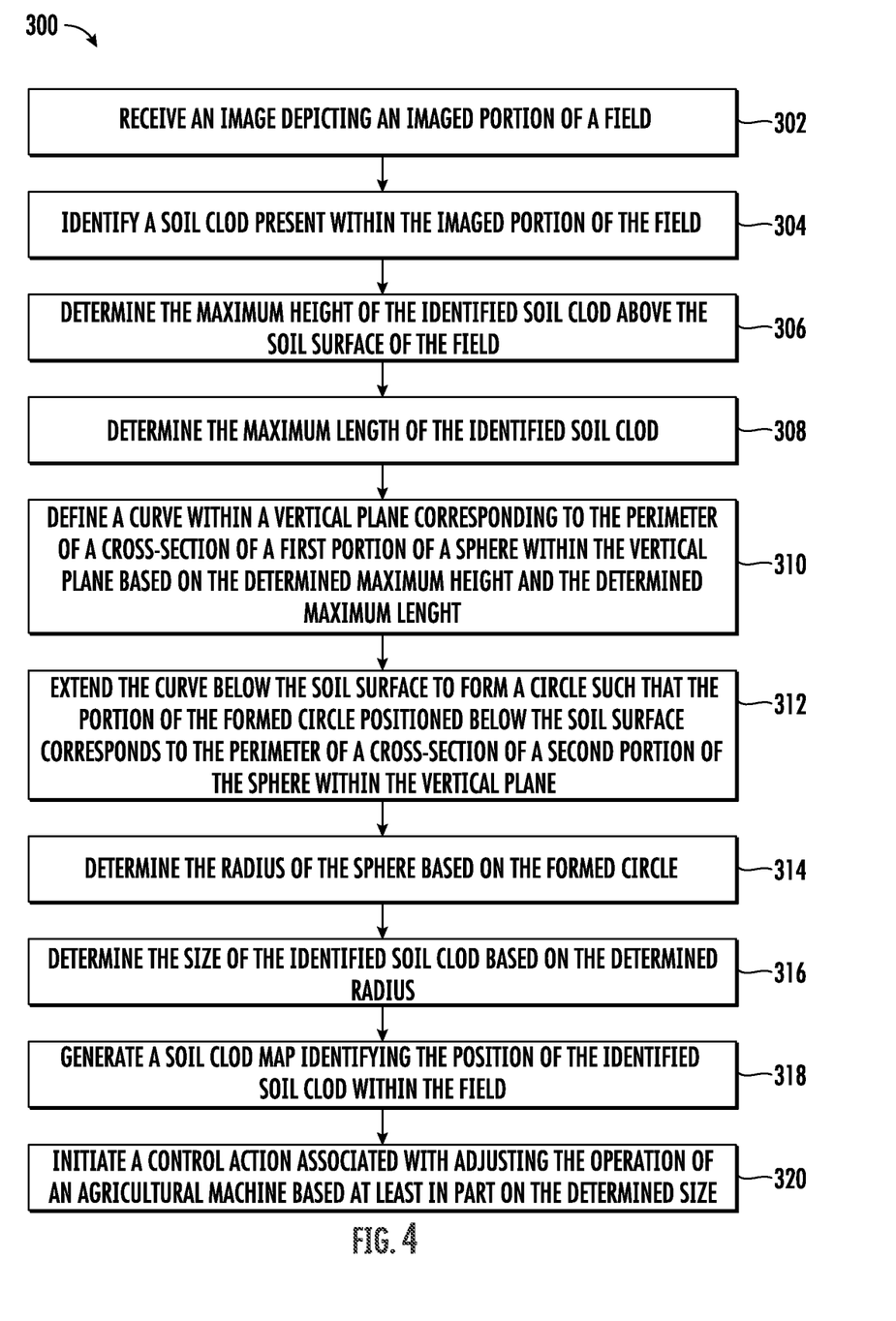
FIG. 4 illustrates a flow diagram providing another embodiment of example control logic for determining soil clod size within a field in accordance with aspects of the present subject matter.

Referring now to FIG. 4, a flow diagram of another embodiment of example control logic 300 that may be executed by the computing system 110 (or any other suitable computing system) for determining soil clod size within a field is illustrated in accordance with aspects of the present subject matter. Specifically, the control logic 300 shown in FIG. 4 is representative of steps of one embodiment of an image processing algorithm that can be executed to determine the size(s) of the soil clod(s) present within the imaged portions of a field with substantial accuracy and without requiring substantial computing resources and/or processing time. Thus, in several embodiments, the control logic 300 may be advantageously utilized in association with a system installed on or forming part of an agricultural machine to allow for real-time determination of soil clod size as the machine travels across the field during the performance of an agricultural operation. However, in other embodiments, the control logic 300 may be used in association with any other suitable system, application, and/or the like for determining soil clod parameters of a field.

As shown in FIG. 4, at (302), the control logic 300 includes receiving an image depicting an imaged portion of the field. In general, (302) of the control logic 300 is the same as or substantially similar to (202) of the control logic 200.

For the purposes of clarity, the below steps of the control logic 300 will be described in the context of processing a single captured image. These steps may be repeated on each subsequently captured image to make soil clod size determinations for the imaged portion of the field associated with each subsequent image.

At (304), the control logic 300 includes identifying a soil clod present within the imaged portion of the field. In general, (304) of the control logic 300 is the same as or substantially similar to (204) of the control logic 200.

Furthermore, at (306), the control logic 300 includes determining the maximum height of the identified soil clod above the soil surface of the field. In general, (306) of the control logic 300 is the same as or substantially similar to (206) of the control logic 200.

Additionally, at (308), the control logic 300 includes determining the maximum length of the identified soil clod. In general, (308) of the control logic 300 is the same as or substantially similar to (208) of the control logic 200.

Figure 6:
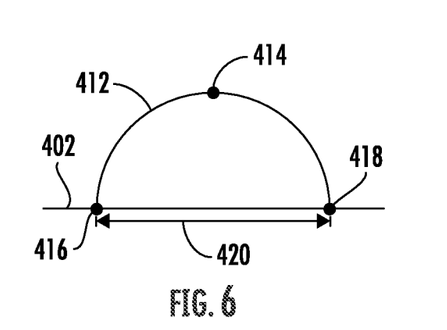
FIG. 6 illustrates an example view of a curve forming the perimeter of a cross-section of a first portion of a sphere approximating a soil clod in a vertical plane in accordance with aspects of the present subject matter.

Moreover, at (310), the control logic 300 includes defining a curve within a vertical plane corresponding to the perimeter of a cross-section of the first portion of the sphere within the vertical plane based on the determined maximum height and the determined maximum length. Specifically, in several embodiments, the computing system 110 may be configured to implement the image analysis module 119 to define a curve within the vertical plane (i.e., a plane extending orthogonal to the soil surface of the field) for each identified soil clod based on the corresponding maximum height (e.g., the height determined at (306)) and the corresponding maximum length (e.g., the length determined at (308)). Each defined curve may, in turn, form a portion of a circle, with the circle representing the perimeter of a cross-section of a sphere approximating the corresponding soil clod. For example, FIG. 6 illustrates an example curve 412 defined in a vertical plane at (310). As shown, the curve 412 extends from either side of a point 414 positioned above the soil surface 404 at the maximum height of the corresponding soil clod. Specifically, the curve 412 extends from the point 414 in a circular manner to points 416, 418 on the soil surface 404 that are spaced apart by a maximum length 420 of the corresponding soil clod. Thus, the curve(s) defined at (310) approximate the perimeter of the cross-section of the identified soil clod(s).

Figure 7:
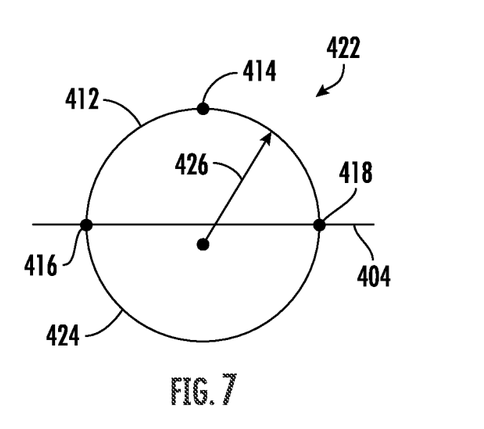
FIG. 7 illustrates an example view of a circle forming the perimeter of a cross-section of a sphere approximating a soil clod in a vertical plane in accordance with aspects of the present subject matter.

In addition, as shown in FIG. 4, at (312), the control logic 300 includes extending the curve below the soil surface to form a circle such that the portion of the formed circle positioned below the soil surface corresponds to a perimeter of a cross-section of the second portion of the sphere within the vertical plane. In several embodiments, the computing system 110 may be configured to implement the image analysis module 119 to extend each curve (e.g., the curve(s) defined at (310)) below the soil surface to form a circle, with the circle representing the perimeter of a cross-section of a sphere approximating the corresponding soil clod. The portion of each formed circle positioned below the soil surface corresponds to the perimeter of a cross-section of the second portion of the sphere (i.e., the portion of the sphere below the soil surface) within the vertical plane. For example, as shown in FIG. 7, the curve 412 was extended from the points 416, 418 below the soil surface 404 to form a circle 422. The curve 412 is extended from the points 416, 418 with the same curvature that was necessary to connect the point 414 to the points 416, 418. The portion 424 of the circle 422 positioned below the soil surface 404 corresponds to the perimeter of a cross-section of the second portion of the sphere (i.e., the portion of the corresponding soil clod buried within the soil) within the vertical plane. Thus, the circle 422 forms the perimeter of a cross-section of the sphere approximating a soil clod.

Furthermore, as shown in FIG. 4, at (314), the control logic 300 includes determining the radius of the sphere based on the formed circle. In several embodiments, the computing system 110 may be configured to implement the image analysis module 119 to determine the radius of each formed circle (e.g., the circle(s) formed at (312)). As such, the computing system 110 may use any suitable image processing or computer vision techniques to determine the radius of each formed circle. For example, as shown in FIG. 7, a radius 426 of the circle 422 may be determined.

Moreover, as shown in FIG. 4, at (316), the control logic 300 includes determining the size of the identified soil clod based on the determined radius of the sphere. In general, (316) of the control logic 300 is the same as or substantially similar to (214) of the control logic 200.

In addition, at (318), the control logic 300 includes generating a soil clod map identifying the position of the identified soil clod within the field. In general, (318) of the control logic 300 is the same as or substantially similar to (216) of the control logic 200.

Furthermore, at (320), the control logic 300 includes initiating a control action associated with adjusting the operation of an agricultural machine based at least in part on the determined soil clod size. In general, (320) of the control logic 300 is the same as or substantially similar to (218) of the control logic 200.

Figure 8:
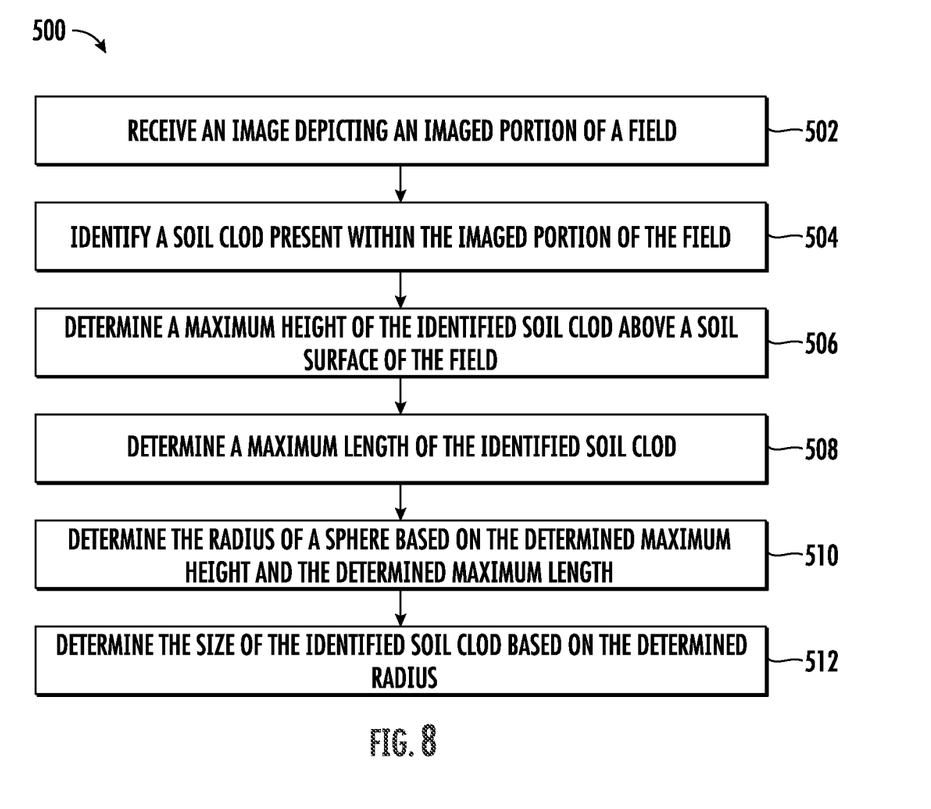
FIG. 8 illustrates a flow diagram of one embodiment of a method for determining soil clod size within a field in accordance with aspects of the present subject matter.

Referring now to FIG. 8, a flow diagram of one embodiment of a method 500 for determining soil clod size within a field is illustrated in accordance with aspects of the present subject matter. In general, the method 500 will be described herein with reference to the agricultural machine 10 and the system 100 described above with reference to FIGS. 1-4. However, it should be appreciated by those of ordinary skill in the art that the disclosed method 500 may generally be implemented with any agricultural machine having any suitable machine configuration and/or within any system having any suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (502), the method 500 may include receiving, with a computing system, an image depicting an imaged portion of a field. For instance, as described above, the computing system 110 may receive an image from the imaging device(s) 104 of the agricultural machine 10 as the machine 10 travels across a field to perform a tillage operation. The received image may depict soil clods present within the field.

Furthermore, at (504), the method 500 may include identifying, with the computing system, a soil clod present within the imaged portion of the field. For instance, as described above, the computing system 110 may analyze the received image to identify one or more soil clods present within the field using any suitable image processing and/or computer vision techniques.

Additionally, as shown in FIG. 8, at (506), the method 500 may include determining, with the computing system, a maximum height of the identified soil clod above a soil surface of the field. For instance, as described above, the computing system 110 may determine the maximum height(s) of the identified soil clod(s) above the soil surface of the field.

Moreover, at (508), the method 500 may include determining, with the computing system, a maximum length of the identified soil clod. For instance, as described above, the computing system 110 may determine the maximum length(s) of the identified soil clod(s).

In addition, as shown in FIG. 8, at (510), the method 500 includes determining, with the computing system, a radius of a sphere based on the determined maximum height and the determined maximum length. For instance, as described above, the computing system 110 may determine the radius of a sphere approximating the approximating each identified soil clod based on the determined maximum height and the determined maximum length.

Furthermore, at (512), the method 500 includes determining, with the computing system, the size of the identified soil clod based on the determined radius. For instance, as described above, the computing system 110 may determine the size of the identified soil clod based on the determined radius.

It is to be understood that the steps of the control logic 200, 300 and the method 500 are performed by the computing system 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 110 described herein, such as the control logic 200, 300 and the method 500, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the control logic 200, 300 and the method 500 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A method for determining soil clod size within a field, the method comprising:
   receiving, with a computing system, an image depicting an imaged portion of the field;
   identifying, with the computing system, a soil clod present within the imaged portion of the field;
   determining, with the computing system, a maximum height of the identified soil clod above a soil surface of the field;
   determining, with the computing system, a maximum length of the identified soil clod;
   determining, with the computing system, a radius of a sphere based on the determined maximum height and the determined maximum length, the sphere including a first portion approximating a portion of the identified soil clod positioned above the soil surface and a second portion approximating a portion of the identified soil clod positioned below the soil surface; and
   determining, with the computing system, a size of the identified soil clod based on the determined radius,
   wherein determining the radius of the sphere comprises determining, with the computing system, a volume of the first portion of sphere based on the determined maximum height and the determined maximum length.

2. The method of claim 1, wherein determining the radius of the sphere comprises further comprises determining, with the computing system, the radius of the sphere based on the determined volume of the first portion of the sphere.

3. The method of claim 1, wherein receiving the captured image comprises receiving, with the computing system, the captured image from an imaging device supported relative to an agricultural machine, the image being captured by the imaging device as the agricultural machine travels across the field.

4. The method of claim 3, further comprising:
   initiating, with the computing system, a control action associated with adjusting an operation of the agricultural machine based at least in part on the determined size of the identified soil clod.

5. The method of claim 4, wherein the control action comprises adjusting at least one of a force being applied to or a position of a ground-engaging tool of the agricultural machine.

6. The method of claim 1, further comprising:
   generating, with the computing system, a soil clod map identifying the position of the identified soil clod within the field.

7. A system for determining soil clod size within a field, the system comprising:
   an imaging device configured to capture an image of a field; and
   a computing system communicatively coupled to the imaging device, the computing system including a processor and associated memory, the memory storing instructions that, when implemented by the processor, configure the computing system to:
   receive an image depicting an imaged portion of the field;
   identify a soil clod present within the imaged portion of the field;

determine a maximum height of the identified soil clod above a soil surface of the field;

determine a maximum length of the identified soil clod;

determine a radius of a sphere based on the determined maximum height and the determined maximum length, the sphere including a first portion approximating a portion of the identified soil clod positioned above the soil surface and a second portion approximating a portion of the identified soil clod positioned below the soil surface; and determine the size of the identified soil clod based on the determined radius, wherein, when determining the radius of the sphere, the computing system is further configured to determine a volume of the first portion of sphere based on the determined maximum height and the determined maximum length.

8. The system of claim 7, wherein, when determining the radius of the sphere, the computing system is further configured to determine the radius of the sphere based on the determined volume of the first portion of the sphere.

9. The system of claim 7, wherein the imaging device is supported relative to an agricultural machine such the image is captured by the imaging device as the agricultural machine travels across the field.

10. The system of claim 9, wherein the computing system is further configured to initiate a control action associated with adjusting an operation of the agricultural machine based at least in part on the determined size of the identified soil clod.

11. The system of claim 10, wherein the control action comprises adjusting at least one of a force being applied to or a position of a ground-engaging tool of the agricultural machine.

12. The system of claim 7, wherein the computing system is further configured to generate a soil clod map identifying the position of the identified soil clod within the field.

13. A method for determining soil clod size within a field, the method comprising:

receiving, with a computing system, an image depicting an imaged portion of the field;

identifying, with the computing system, a soil clod present within the imaged portion of the field;

determining, with the computing system, a maximum height of the identified soil clod above a soil surface of the field;

determining, with the computing system, a maximum length of the identified soil clod;

determining, with the computing system, a radius of a sphere based on the determined maximum height and the determined maximum length, the sphere including a first portion approximating a portion of the identified soil clod positioned above the soil surface and a second portion approximating a portion of the identified soil clod positioned below the soil surface; and determining, with the computing system, a size of the identified soil clod based on the determined radius, wherein determining the radius of the sphere comprises defining, with the computing system, a curve within a vertical plane corresponding to a perimeter of a cross-section of the first portion of the sphere within the vertical plane based on the determined maximum height and the determined maximum length, the vertical plane being orthogonal to the soil surface.

14. The method of claim 13, wherein determining the radius of the sphere further comprises extending, with the computing system, the curve below the soil surface to form a circle such that the portion of the formed circle positioned below the soil surface corresponds to a perimeter of a cross-section of the second portion of the sphere within the vertical plane.

15. The method of claim 14, wherein determining the radius of the sphere further comprises determining, with the computing system, the radius of the sphere based on the formed circle.

* * * * *